United States Patent
Tokita et al.

[19]

[11] Patent Number: 6,123,619

[45] Date of Patent: Sep. 26, 2000

[54] METHOD OF GENERATING MAPS WITH FIXED AND RANDOM PORTIONS AND USE OF SAME IN VIDEO GAMES

[75] Inventors: Takashi Tokita, Kanagawa, Japan; Shawn Taras, Honolulu, Hi.

[73] Assignee: Square Co., Ltd., Tokyo, Japan

[21] Appl. No.: 09/274,320

[22] Filed: Mar. 23, 1999

[51] Int. Cl.[7] .................................................. A63F 13/00
[52] U.S. Cl. .................................. 463/43; 463/1; 463/30
[58] Field of Search .............................. 463/7, 8, 9, 15, 463/1, 30–34, 43, 44

[56] References Cited

U.S. PATENT DOCUMENTS

| | | |
|---|---|---|
| Re. 35,314 | 8/1996 | Logg . |
| 4,240,638 | 12/1980 | Morrison et al. ........................ 463/15 |
| 4,305,131 | 12/1981 | Best ....................................... 345/327 |
| 4,410,181 | 10/1983 | Lapp et al. ............................. 273/238 |
| 5,050,883 | 9/1991 | Goldfarb et al. ........................ 463/15 |
| 5,580,308 | 12/1996 | Nakamura ............................... 463/7 |
| 5,604,855 | 2/1997 | Crawford ................................ 345/473 |
| 5,616,079 | 4/1997 | Iwase et al. . |
| 5,649,862 | 7/1997 | Sakaguchi et al. ..................... 463/44 |
| 5,679,075 | 10/1997 | Forrest et al. .......................... 463/9 |
| 5,752,883 | 5/1998 | Butcher et al. ......................... 463/43 |

OTHER PUBLICATIONS

Gygax, Advanced Dungeons and Dragons Dungeon Master' Guide, 1979, TSR Games, 169–195.

*Primary Examiner*—Valencia Martin-Wallace
*Assistant Examiner*—John M. Hotaling, II
*Attorney, Agent, or Firm*—Oblon, Spivak, McClelland, Maier & Neustadt, P.C.

[57] ABSTRACT

A space in which a character is movable is divided into a plurality of sections. Of those sections, some sections are of a first type which are set with a specific event such as a fight with a boss character, while other sections are of a second type. Randomly extracted maps are employed in association with the sections of the second type. In the case of the sections of the first type, the corresponding fixed maps particular thereto are loaded from a storage medium into a memory. In the case of the sections of the second type, map data extracted randomly from the corresponding plural map data are loaded from the storage medium into the memory. A map defining a movable area for the character is generated in accordance with the loaded map data.

26 Claims, 12 Drawing Sheets

| CURRENT FLOOR DATA | 4 |
|---|---|
| FIXED MAP EMPLOYING FLOOR | 1,10,20,30,40,50,60,61,62, |
| RANDOMLY EXTRACTED MAP NUMBER | 58 |
| ⋮ | ⋮ |

FIG. 4

| | |
|---|---|
| 62F | FIXED MAP |
| 61F | FIXED MAP |
| 60F | FIXED MAP |
| ⋮ | ⋮ |
| 52F | RANDOM MAP |
| 51F | RANDOM MAP |
| 50F | FIXED MAP |
| 49F | RANDOM MAP |
| 48F | RANDOM MAP |
| ⋮ | ⋮ |
| 6F | RANDOM MAP |
| 5F | RANDOM MAP |
| 4F | RANDOM MAP |
| 3F | RANDOM MAP |
| 2F | RANDOM MAP |
| 1F | FIXED MAP |

FIG. 7

| | 21 |
|---|---|
| CURRENT FLOOR DATA | 34 |
| FIXED MAP | 1,10,20,30,40,50,60,61,62, |
| RANDOMLY EXTRACTED MAP NUMBER | 24 |
| PROGRESS DEGREE DATA | 3 |
| ⋮ | ⋮ |

FIG. 9

| PROGRESS DEGREE DATA | RANDOM NUMBER GENERATION RANGE | |
|---|---|---|
| 1 | 1~a | (GROUP A) |
| 2 | a+1~a | (GROUP B) |
| 3 | b+1~a | (GROUP C) |
| 4 | c+1~a | (GROUP D) |
| 5 | d+1~a | (GROUP E) |

| CURRENT FLOOR DATA | | 14 | |
|---|---|---|---|
| FIXED MAP EMPLOYING FLOOR | | 1,10,20,30,40,50,60,61,62, | |
| RANDOMLY EXTRACTED MAP NUMBER | (2 F) | 58 | 1 |
| | (3 F) | 11 | 1 |
| | ⋮ | ⋮ | ⋮ |
| | (59 F) | — | 0 |
| ⋮ | | ⋮ | |

23d (brace covering the (2F)–(59F) rows)
23 (table label)

METHOD OF GENERATING MAPS WITH FIXED AND RANDOM PORTIONS AND USE OF SAME IN VIDEO GAMES

BACKGROUND OF THE INVENTION

1. Field of the Invention

The present invention relates to a technique for generating, in a video apparatus, a map defining an area in which characters (including a virtual man, creature and vehicle; the same applies to the following) are movable.

2. Description of the Related Art

Some video games are of a type in which a game is advanced by moving characters within a movable space (e.g. a virtual three-dimensional space) in accordance with an input from an input device. In general, however, the characters adopted in such video games are not movable everywhere within the movable space, and their movable area is limited by a map.

In general, conventional video games employ a preset fixed map as the map that defines the movable area of the characters. However, in video games employing such a fixed map, their future developments become totally anticipated by players as the number of times the players have played the game increases, and it is therefore difficult for the players to play the games again and again without them loosing interest in the games.

Also known is a video game in which the individual elements (parts) to form a map are prepared as data and are appropriately combined to generate the map automatically, in consideration of the above. In such a video game, each time a player executes the game, a different map is generated so that he/she can play substantially the same game over and over many times without loosing interest.

U.S. Pat. No. 4,240,638, U.S. Pat. No. Reissued 35314 and U.S. Pat. No. 5,616,079 relate to maps.

U.S. Pat. No. 4,240,638 discloses a game apparatus that generates a labyrinth path at random.

U.S. Pat. No. Reissued 35314 also discloses a labyrinth path, as well as U.S. Pat. No. 4,240,638.

U.S. Pat. No. 5,616,079 discloses a game apparatus which displays images, using pieces of segmented map information that differ in the number of map segments depending on the distance from a given view point.

Designing the map form which contributes toward the game progress, i.e., variously designing both a method for generating a map and the form of the map data required for that purpose in such video games is a factor that enhances the fun and stage effects of the games.

SUMMARY OF THE INVENTION

It is an object of the present invention to provide a method for generating a divided map through the use of either map data particular to each section of the map or randomly extracted map data.

According to the first aspect of the present invention, in order to attain the above object, there is provided a video game apparatus for generating a map defining a range of movement of a character that moves in accordance with external instructions, comprising:

storage means for storing map data for sections of a first type in association with the sections which are among a plurality of sections provided by dividing the map and which are set with a specific event, and for storing plural map data for sections of a second type other than the sections of the first type;

section designating means for designating at least one section as a map generation target among the plurality of sections, in accordance with the movement of the character;

section discriminating means for discriminating whether the section designated by the section designating means is of the first type or the second type; and map generating means for generating a map for the section, based on the map data stored in the storage means stores in association with the section, in the case where the section discriminating means discriminates that the section is of the first type, and for generating a map for the section, based on any of the plural map data which the storage means stores in association with the sections of the second type, in the case where the section discriminating means discriminates that the section is the second type.

According to the above-described video game apparatus, a space in which the character is able to move is divided into a plurality of sections, and those sections are distinguished into sections of the first type which are set with a specific event and sections of the second type. The section discriminating means discriminates what type of section for which a map is to be generated is, whereby either a fixed map or a randomly generated map can be employed according to section. Thus, by virtue of using the fixed and randomly generated maps in combination with each other, variety can be given to the game progress.

Although the sections of the first type which are set with a specific event and other sections of the second type differ in map generating method from each other, they may be identical to each other in terms of processing based on a generated map. This eliminates the need to prepare different programs for the sections of the first type and the sections for the second type, in regard to processing other than the map generation. In this case, since program reloading is unnecessary, the waiting time while switching is being performed between one section of the first type and another section of the second type is shortened accordingly.

According to the above-described video game apparatus, in the case where the character moves from one section to another, the section designating means can designate a moving destination section as a section for which a map is to be generated.

According to the above-described video game apparatus, in the case where the section discriminating means discriminates that the section is of the second type, the map generating means may re-generate a map for the section, based on any of the plural map data for the sections of the second type, even if a map has already been generated for the section.

In such a case, a map data selecting method for the sections of the first type and that for the sections of the second type will differ from each other, however, maps for the sections of the first and second types can be generated with substantially the same process. The number of programs to be separately prepared according to section type is reduced, as well as the number of program developing steps. Furthermore, in the case of generating a map for a section of the second type, the map can be generated selecting map data for the section of the second type through the execution of a random function, for example, and consequently the time required for the map generation will be shortened as well.

In the case where the section discriminating means discriminates that the section is of the second type, the map generating means may generate a map for the section, based on map data extracted randomly from the plural map data for the sections of the second type.

And the plural map data for the sections of the second type, stored in the storage means, may have been classified into groups in accordance with a predetermined standard; and in the case where the section discriminating means discriminates that the section is of the second type, the map generating means may generate a map for the section, based on any map data included in a pre-designated group.

Under that condition, the above-described video game apparatus may further comprise group designating means for designating, in accordance with either (1) the degree of the game progress or (2) the external setting, a group from which the map data is to be selected in the case where the map generating means generates a map for the section of the second type.

In that case, the above-described video game apparatus may further comprise map registering means for registering the map which the map generating means has generated for the section of the second type, in association with the section for which the map has been generated.

In the above-described video game apparatus, the map may be shaped into floors, and each floor may correspond to one of the sections of the first and second types.

According to the second aspect of the present invention, in order to attain the aforementioned object, there is provided a video game apparatus which comprises an input device, a storage device and a processing unit and which generates a map defining a range of movement of a character, wherein the input device inputs information for moving the character;

the storage device stores a program comprising a section designating step of designating at least one section as a map generation target among a plurality of sections provided by dividing the map, in accordance with the movement of the character, a section discriminating step of discriminating whether the section designated by the section designating step is a section of a first type which is set with a specific event or a section of a second type other than the section of the first type, and a map generating step of generating a map for the section, based on map data pre-stored in association with the section, in the case where the section discriminating step discriminates that the section is the section of the first type, and generating a map for the section, based on any of plural map data pre-stored in association with sections of the second type, in the case where the section discriminating step discriminates that the section is of the second type; and the processing unit executes the program stored in the storage device, and generates display data for displaying the generated map in accordance with the movement of the character.

According to the third aspect of the present invention, in order to attain the aforementioned object, there is provided a method for generating a map defining a range of movement of a character that moves in accordance with an external instruction, the method comprising:

a section designating step of designating at least one section as a map generation target among a plurality of sections provided by dividing the map, in accordance with the movement of the character;

a section discriminating step of discriminating whether the section designated by the section designating step is a section of a first type which is set with a specific event or a section of a second type section other than the section of the first type; and a map generating step of generating a map for the section, based on map data pre-stored in association with the section, in the case where the section discriminating step discriminates that the section is of the first type, and generating a map for the section, based on any of plural map data pre-stored in association with sections of the second type, in the case where the section discriminating step discriminates that the section is of the second type.

According to the above-described map generating method, in the case where the character moves from one section to another, the section designating step may designate a moving destination section as a section for which a map is to be generated.

Under the above circumstance, in the case where the section discriminating step discriminates that the section is of the second type, the map generating means may re-generate a map for the section, based on any of the plural map data for the sections of the second type, even if a map has already been generated for the section.

Furthermore, in the case where the section discriminating step discriminates that the section is of the second type, the map generating step may generate a map for the section, based on map data extracted randomly from the plural map data for the sections of the second type.

Moreover, the plural map data for the sections of the second type may be pre-stored, being classified into groups in accordance with a predetermined standard; and in the case where the section discriminating step discriminates that the section is of the second type, the map generating step may generate a map for the section, based on any map data included in a pre-designated group.

Under this condition, the above-described map generating method may further comprise a group designating step of designating, in accordance with the degree of the game progress, a group from which the map data is to be selected in the case where the map generating step generates a map for the section of the second type.

By causing a game dedicated machine or a general-purpose computer to execute a map generating method comprising such steps, the same effects and advantages as those of the video game apparatus described previously can be attained.

The above-described video game apparatus can be attained by distributing a storage medium which stores a program including the individual steps that the above-described map generating method comprises, and by loading the program from the storage medium into a computer to execute the program. By thus utilizing the storage medium which is independent from the apparatus as a software product, the program for realizing the present invention can be easily distributed and put on sale.

The storage medium in the above case is a computer readable storage medium containing a program stored therein for generating a map defining the range of movement of a character that moves in accordance with an external instruction, the program comprising:

a section designating step of designating at least one section as a map generation target among a plurality of sections provided by dividing the map, in accordance with the movement of the character;

a section discriminating step of discriminating whether the section designated by the section designating step is a section of a first type which is set with a specific event or a section of a second type other than the section of the first type; and a map generating step of generating a map for the section, based on map data pre-stored in association with the section, in the case where the section discriminating step discriminates that the section is of the first type, and generating a map for the section, based on any of plural map data pre-stored in association with sections of the second type, in the case where the section discriminating step discriminates that the section is of the second type.

In the case where the character moves from one section to another, the section designating step of the program, stored in the above-described computer readable storage medium, may designate a moving destination section as a section for which a map is to be generated.

Moreover, the map generating step of the program, stored in the above-described computer readable storage medium, may re-generate a map for the section, based on any of the plural map data for the sections of the second type in the case where the section discriminating step discriminates that the section is of the second type, even if a map has already been generated for the section; the map generating step may generate a map for the section, based on map data extracted randomly from the plural map data for the sections of the second type in the case where the section discriminating step discriminates that the section is of the second type.

Furthermore, the plural map data for the sections of the second type, stored in the storage means, may have been classified into groups in accordance with a predetermined standard; and in the case where the section discriminating step discriminates that the section is of the second type, the map generating step may generate a map for the section, based on any map data included in a pre-designated group.

In that case, the program may further comprise a group designating step of designating, in accordance with the degree of the game progress, a group from which the map data is to be selected in the case where the map generating step generates a map for the section of the second type.

Furthermore, the program for realizing the individual steps which the above-described map generating method comprises can easily be distributed and put on sale by embedding the program as a computer signal in a carrier wave.

The computer data signal in the above case is a computer data signal embodied in a carrier wave and including a program for causing a computer to generate a map defining a range of movement of a character that moves in accordance with an external instruction, the computer data signal comprising:

a section designating step of designating at least one section as a map generation target among a plurality of sections provided by dividing the map, in accordance with the movement of the character;

a section discriminating step of discriminating whether the section designated by the section designating step is a section of a first type which is set with a specific event or a section of a second type other than the section of the first type; and a map generating step of generating a map for the section, based on map data pre-stored in association with the section, in the case where the section discriminating step discriminates that the section is of the first type, and generating a map for the section, based on any of plural map data pre-stored in association with sections of the second type, in the case where the section discriminating step discriminates that the section is of the second type.

The advantages and other merits of the present invention will become more fully understood from the preferred embodiments, the claims and the drawings, a brief description of which is presented below.

BRIEF DESCRIPTION OF THE DRAWINGS

FIG. 4 is a diagram showing the relationship between floors employing map data representing a fixed map and floors employing map data representing random maps.

FIG. 7 is a diagram illustrating a map control table according to the second embodiment.

FIG. 9 is a diagram illustrating a random number control table adopted in the second embodiment.

FIG. 11 is a diagram showing a modification of the map control table.

DETAILED DESCRIPTION OF THE PREFERRED EMBODIMENTS

Embodiments of the present invention will now be described with reference to the accompanying drawings. In the embodiments which will be described hereinafter, explanations will be presented, exemplifying a game which is advanced by moving characters on a map shaped into a building with a plurality of floors, which characters assume activities in the game (the characters comprehend objects that move in the game, such as a virtual man, creature and vehicle). The particular character which moves as manipulated by a player will hereinafter be referred to as his/her own character (the player character).

First Embodiment

Figure 1:
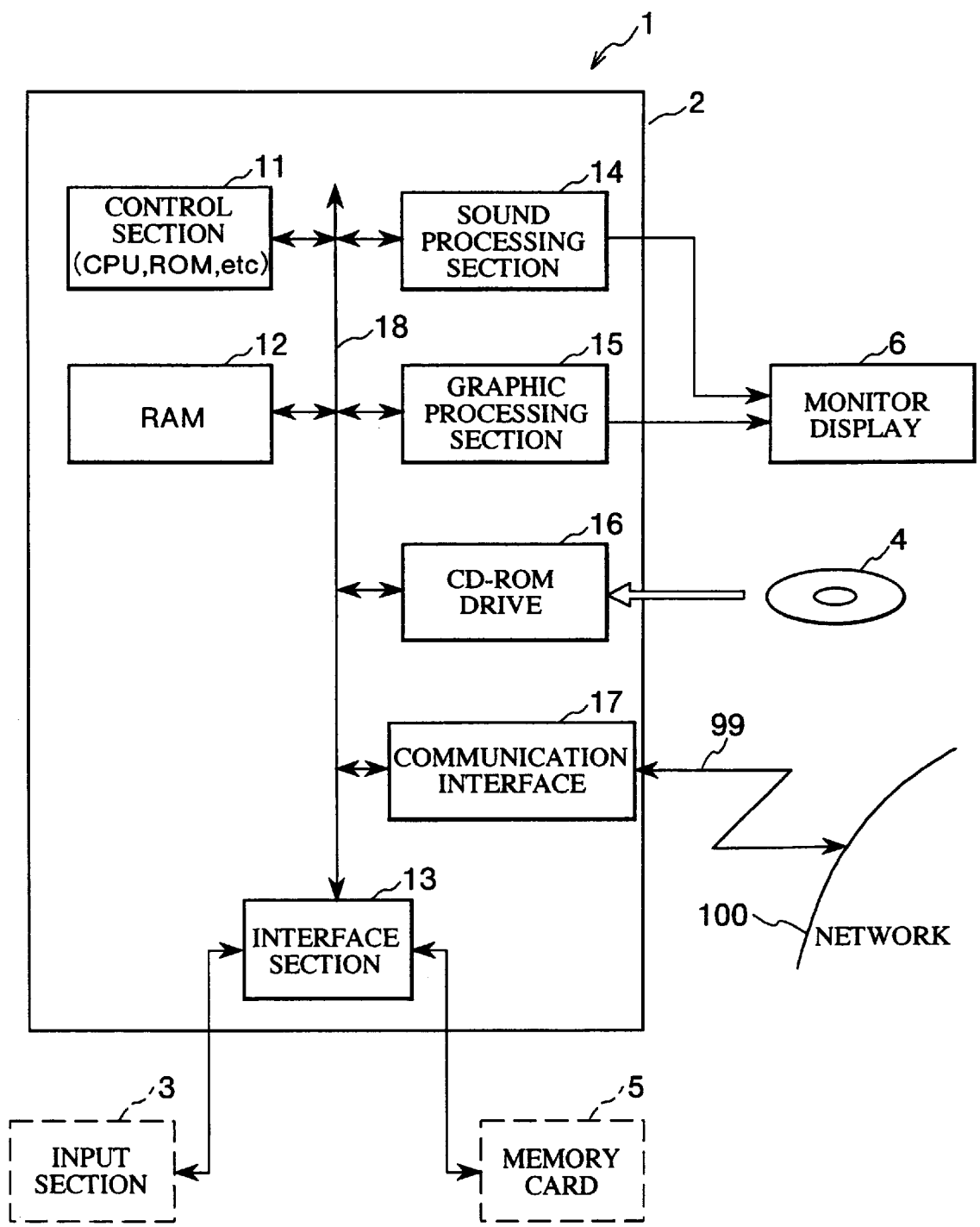
FIG. 1 is a block diagram illustrating the structure of a video game apparatus according to an embodiment of the present invention.

FIG. 1 is a block diagram illustrating the structure of a video game apparatus according to the first embodiment of the present invention. As illustrated, the video game apparatus 1 includes a video game machine main body 2, an input section 3, a memory card 5, a CD-ROM (Compact Disc Read Only Memory) 4 and a monitor display 6, for example.

The video game machine main body 2 comprises a control section 11, a RAM (Random Access Memory) 12, an interface section 13, a sound processing section 14, a graphic processing section 15, a CD-ROM drive 16 and a communication interface 17, all being connected to each other via a bus 18.

The control section 11, which includes a CPU (Central Processing Unit) and a ROM (Read Only Memory) that stores a boot program and a fundamental program for an OS (Operating System) or the like, etc., sequentially executes a program stored in the RAM 12 and performs processing for advancing the game. The control section 11 also controls the individual sections 12 to 17 included in the video game machine main body 2.

The RAM 12, which is used as the main memory for the video game machine main body 2, stores a program and data required for advancing the game. The RAM 12 is used also as a work area during the time of program execution. The areas assigned to the RAM 12 and the data stored in each area will be described later in detail.

The interface section 13, to which the input section 3 and the memory card 5 are connected, controls an exchange of data between them and the bus 18. Moreover, the input section 3 has directional keys and a variety of buttons, and a plurality of inputs necessary for advancing the game, such as a moving instruction and an activity instruction with respect to the player character, are input to the input section 3. Further, the memory card 5 is used to save data representing the state of the game progress.

In accordance with instructions from the control section 11, the sound processing section 14 performs processing for reproducing sound data such as BGM (BackGround Music) and effective sounds depending on the state of the game progress, and outputs them as audio signals to the monitor display 6.

In accordance with instructions from the control section 11, the graphic processing section 15 performs three-dimensional graphic processing so as to generate image data depending on the state of the game progress. The graphic processing section 15 affixes a predetermined sync signal to the generated image data, and outputs the resultant image data as a video signal to the monitor display 6.

In accordance with instructions from the control section 11, the CD-ROM drive 16 drives the CD-ROM 4 which has been set in the game machine main body 4, in order to transfer a program and data stored in the CD-ROM 4 to the RAM 12 through the bus 18.

The communication interface 17, which is connected to an external network 100 through a communication cable 99, performs processing for exchanging a program and data between the communication interface 17 and the external network 100.

The CD-ROM 4 stores a program and data required for advancing the game. The program and data as stored are read out from the CD-ROM 4 by being driven by the CD-ROM drive 16. The program and data, which have been read out from the CD-ROM 4, are transferred from the CD-ROM drive 16 to the RAM 12 through the bus 18.

The monitor display 6 has a display which comprises a CRT (Cathode Ray Tube), etc. for displaying an image corresponding to the video signal sent from the graphic processing section 15, and a speaker which outputs sound corresponding to the audio signals sent from the sound processing section 14. Normally a television receiver according to NTSC or the like is used as the monitor display.

The areas assigned to the RAM 12 of FIG. 1 and the data stored in each area will be explained next in detail.

Figures 2, 3:
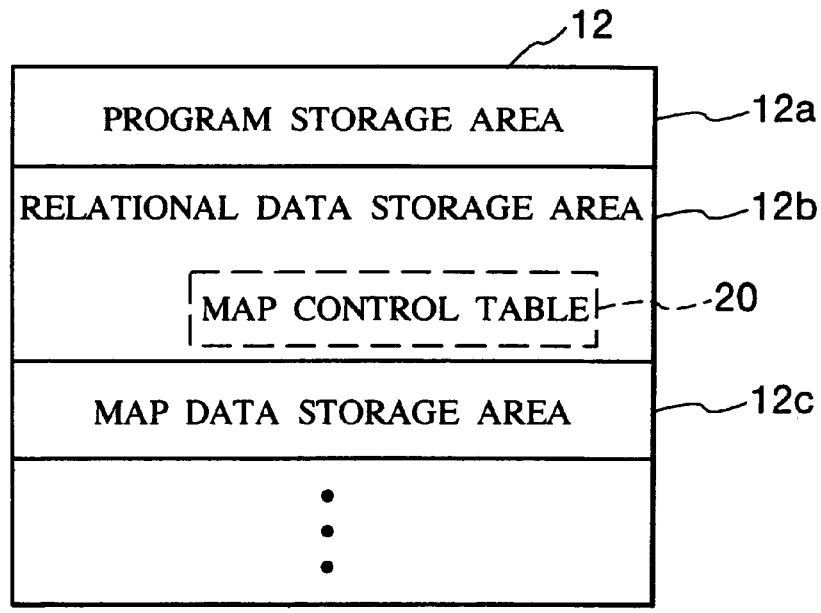
FIG. 2 is a diagram illustrating areas assigned to a RAM of FIG. 1.
FIG. 3 is a diagram illustrating a map control table according to the first embodiment.

FIG. 2 is a diagram illustrating the areas assigned to the RAM 12. As illustrated, a program storage area 12a, a relational data storage area 12b and a map data storage area 12c are assigned to the RAM 12. The CD-ROM drive 16 reads out any program and data stored in those areas 12a to 12c from the CD-ROM 4, and transfers them to the RAM 12 in accordance with the control effected by the control section 11.

The program storage area 12a stores a program required for executing the game, such as a program shown in the flowchart which will be explained later.

The relational data storage area 12b, which stores various data necessary to generate a map in accordance with a movement of the player character, stores a map control table 20.

FIG. 3 is a diagram illustrating the map control table 20 stored in the relational data storage area 12b. As illustrated, the map control table 20 has a column to store "current floor data", a column to store a "fixed map employing floor" and a column to store a "randomly extracted map number", for example.

The "current floor data" column specifies the floor number indicating the floor where the player character that moves in accordance with a player's operation of the input section 3 is located in a building-shaped movable area.

The "fixed map employing floor" column specifies the numbers indicating the floors which employ their corresponding fixed maps and which are set with a specific event or a fight between an especially strong enemy character (hereinafter referred to as the boss character) and the player character. In the example shown in FIG. 3, floors 1, 10, 20, 30, 40, 50 and 60, as well as floors 61 and 62 which are higher than floor 60, are designated as the floors which employ map data representing the fixed maps. Floors other than those employing the fixed maps, adopt map data representing random maps. Accordingly, an image showing which of the map data representing the fixed maps and the map data representing the random maps the individual floors employ, appears as illustrated in FIG. 4.

The "randomly extracted map number" column registers the map data number (1, 2, . . . , n) which indicates, among the map data representing n random maps (n being an natural number) stored in the CD-ROM 4 as will be explained later, the map data extracted through the processing carried out by the control section 11. In the case where the player character is located on a floor employing a fixed map, the map number registered in the aforementioned column is ignored.

The map data storage area 12c stores map data selected according to the floor on which the player character is located. In the case where the player character is located on a floor presenting a fixed map, map data according to the floor is selected, whereas in the case where the player character is located on a floor presenting a random map, i.e., a floor other than the floors which employ the fixed maps, the control section 11 selects map data at random. The CD-ROM 4 stores all map data to be selected and stored in the map data storage area 12c.

Figure 5A:
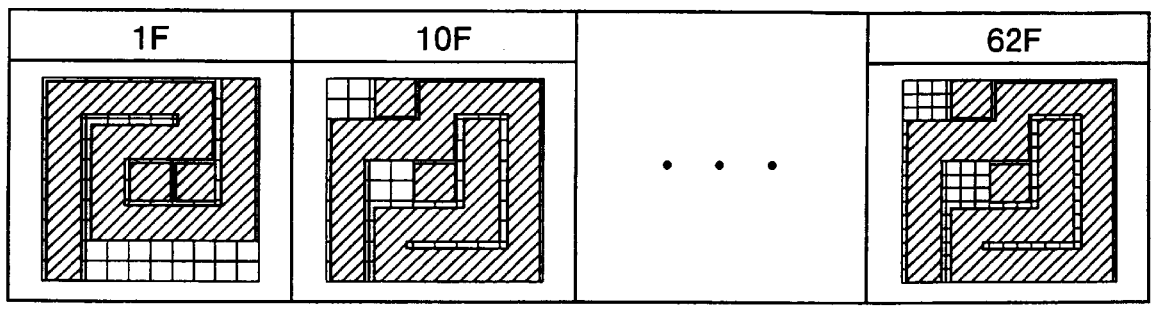
FIGS. 5A and 5B are diagrams demonstrating the map data according to the first embodiment.

FIG. 5A is a diagram demonstrating the map data representing the fixed maps. As illustrated, the map data representing the fixed maps are stored in the CD-ROM 4 in association with the floor numbers specified in the "fixed map employing floor" column of the map control table 20.

Figure 5B:
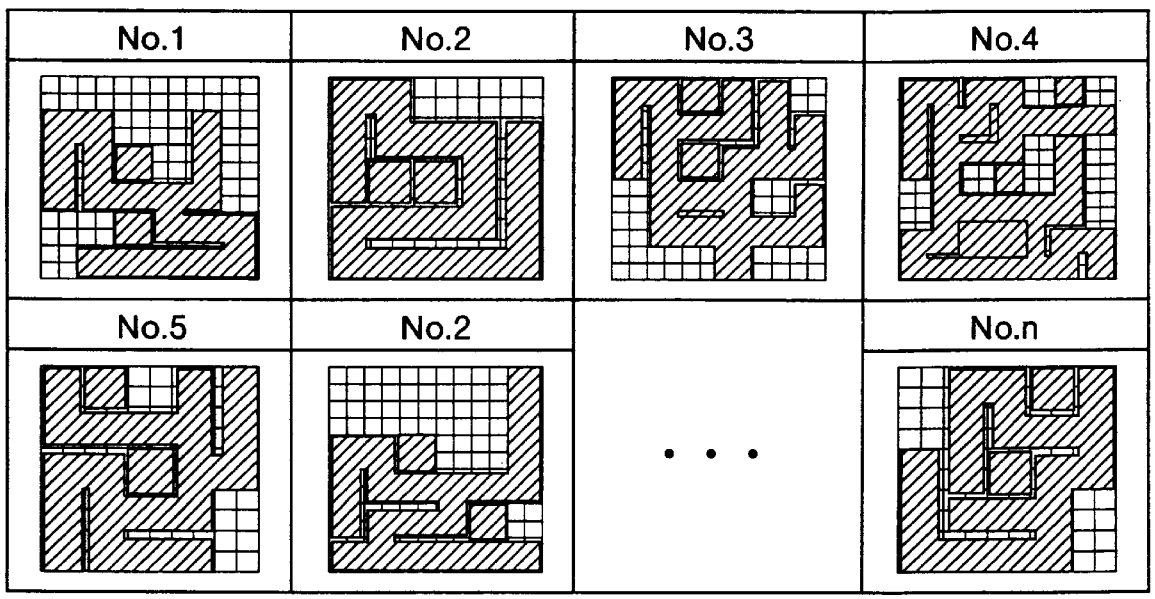

FIG. 5B is a diagram demonstrating the map data representing the random maps. As illustrated, the map data representing the random maps are assigned their respective particular numbers (1, 2, . . . , n), and are stored in the CD-ROM 4 in association with those particular numbers.

Processing for generating a map, which the control section 11 executes in the video game according to the first embodiment, will now be described with reference to the flowchart of FIG. 6. When needed, the processing shown in the flowchart of FIG. 6 is executed using a timer interrupt and in parallel with processing for moving the player character in accordance with an input from the input section 3.

Figure 6:
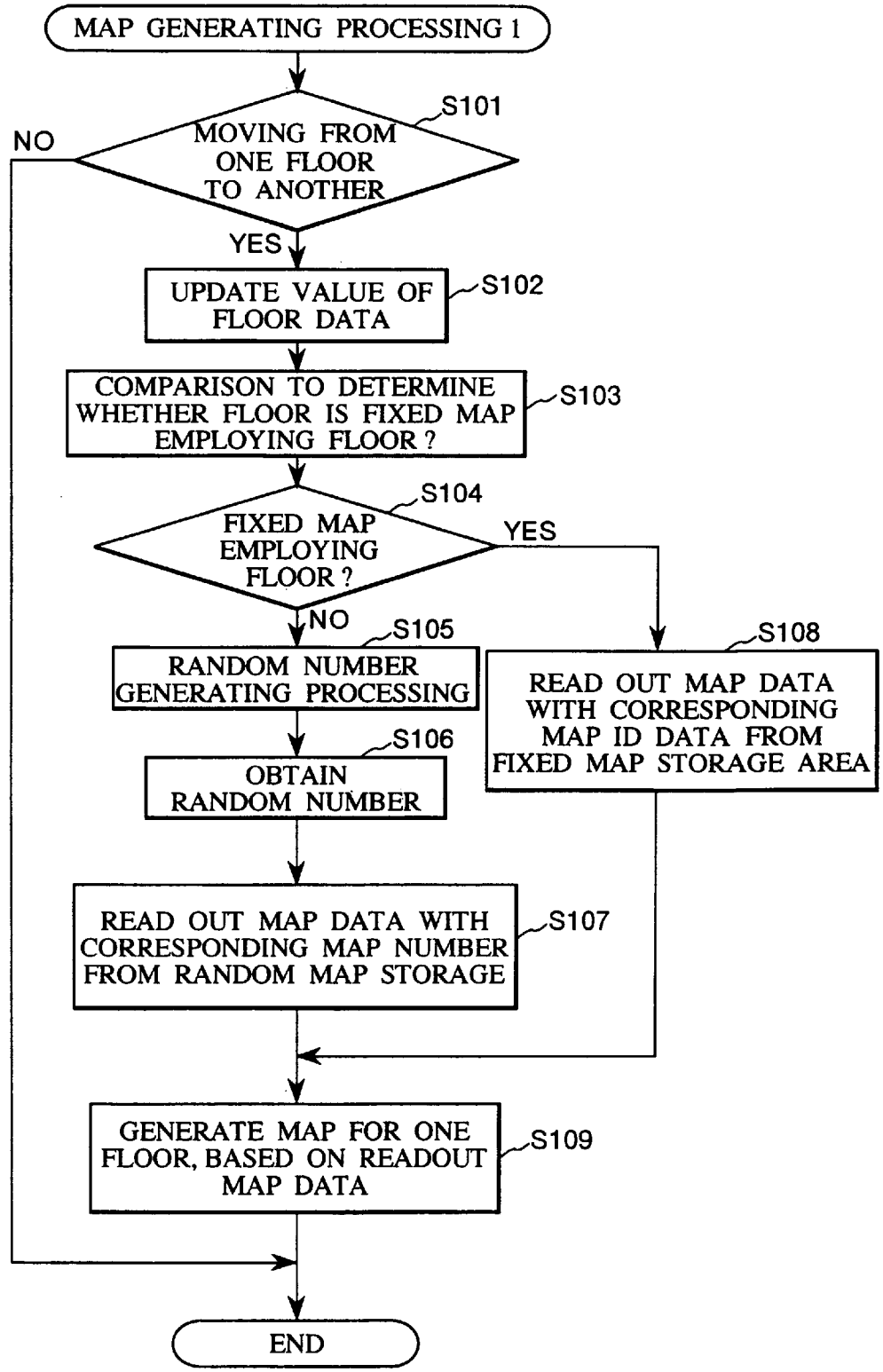
FIG. 6 is a flowchart showing processing performed in the first embodiment.

In the flowchart of FIG. 6, it is first determined whether the player character is moving from one floor to another in the building-shaped movable area in accordance with an input from the input section 3 (a step S101). In the case where it is determined that the player character is not moving from one floor to another, the processing shown in the flowchart ends.

On the other hand, in the case where it is determined that the player character is moving from one floor to another, the value of the "current floor data" stored in the map control table 20 is updated. More specifically, in the case where the player character is moving from one floor to a higher floor, the value is incremented by 1, whereas in the case where the player is moving from one floor to a lower floor, the value is decremented by 1 (a step 102). The control section 11 thus performs the designation of a section.

In the case where the value of the "current floor data" is updated, the value of the "current floor data" after updated is compared sequentially with the values specified in the "fixed map employing floor" column of the map control table 20 (a step S103). As the result of this comparison, it is determined whether the value of the "current floor data" matches with any one of the values specified in the "fixed map employing floor" column (a step S104). The control section 11 thus performs the discrimination of a section.

In the case where it is determined that the value of the "current floor data" does not match with any one of the values specified in the "fixed map employing floor" column, the processing of generating a random number within a range of 1 to n is conducted (a step S105). Then, the control section 11 obtains the random number generated by this processing (a step S106).

In the case where the control section 11 obtains the random number, it sends a request to read out map data representing a random map, stored in the CD-ROM 4 in association with the random number as shown in FIG. 5B, to the CD-ROM drive 16 through the bus 18. In response to this request, the CD-ROM drive 16 drives the CD-ROM 4 to read out the map data representing the random map associated with the aforementioned number, and transfers the map data to the map data storage area 12c of the ROM 12 through the bus 16 (a step S107). Thereafter, the processing advances to a step S109.

On the other hand, in the case where it is determined in step S104 that the value of the "current floor data" matches with any one of the values specified in the "fixed map employing floor" column, the control section 11 sends a request to read out map data representing a fixed map, stored in the CD-ROM 4 in association with the value of the "current floor data" as shown in FIG. 5A, to the CD-ROM drive 16 through the bus 18. In response to this request, the CD-ROM drive 16 drives the CD-ROM 4 to read out the map data representing the fixed map associated with the aforementioned value, and transfers the map data to the map data storage area 12c of the RAM 12 (a step S108). Thereafter, the processing advances to step S109.

In step S109, an item, enemy characters, etc. are arranged based on the map data transferred to the map data storage area 12c in the step S107 or S108, and the process of generating a map for one floor is performed. The control section 11 thus generates the map. Then, the processing shown in the flowchart ends.

After the completion of the processing shown in the flowchart of FIG. 6, the image of the generated map when projected on a two-dimensional plane from a predetermined view point in accordance with a movement of the character on the aforementioned floor, is generated by cooperation of the control section 11 and the graphic processing section 15. The graphic processing section 15 generates an image signal corresponding to the image, and outputs the signal to the monitor display 6 so that the image is displayed on the monitor display 6. The game is advanced by repeating the above steps.

As described above, according to the video game apparatus of the first embodiment, either the fixed maps or the random maps are generated in accordance with the floors in the building-shaped movable range. Because of this, in regard to the floors for which the random maps are generated, the map defining the movable area of the player character differs each time the player conducts the game, thereby preventing the player from loosing interest while he/she is playing the game again and again. Moreover, the floors on which a specific event is arranged employ the fixed maps, while other floors employ the random maps so that the progress of the game is more exciting.

The floors employing the fixed maps and those employing the random maps differ from each other only in the method for selecting map data. This eliminates the need to develop completely different programs depending on whether the floors employ the fixed maps or the random maps, and permits the number of steps required for the program development to be reduced. Furthermore, in the case where the player character moves between a fixed map employing floor and a random map employing floor, if the map data stored in the map data storage area 12c is replaced with another, program reloading need not be performed and the intervening waiting time is accordingly short.

In regard to the random map employing floor, if map data according to the generated random number is selected from among n map data pre-stored in the CD-ROM 4, the map for the floor is generated based on the map data, under which conditions the time required for generating the map is also short.

Second Embodiment

The structure of a video game apparatus according to the second embodiment is almost the same as that of the video game apparatus according to the first embodiment. However, the map control table, which is stored in the relational data storage area 12b, differs from that of the first embodiment. The map data representing the random maps, stored in the map data storage area 12c, are classified into groups according to difficulty. A random control table, which will be explained later, is stored in the relational data storage area 12b.

FIG. 7 is a diagram illustrating a map control table 21 according to the second embodiment. As illustrated, the map control table 21 has an additional "progress degree data" column, compared to the map control table 20 of the first embodiment. The "progress degree data" has the initial value "1", which is incremented by the control section 11 each time a specific event is cleared on a floor employing a fixed map, and the higher the value is, the more difficult the extracted random map level is. The control section 11, which thus updates the progress degree data, performs group designation.

FIGS. 8A to 8E are diagrams demonstrating map data representing random maps according to the second embodiment. FIGS. 8A to 8E illustrate a group A41, a group B42, a group C43, a group D44 and a group E45, with each group corresponding to a progress degree data value. Moreover, as illustrated, the map data representing the random maps are assigned their particular numbers (1, 2, ..., a, a+1, a+2, ..., b, b+1, ...), and are stored in the CD-ROM 4 in association with those numbers. The symbols a, b, c, d, N, recited in FIGS. 8A to 8E and FIG. 9 which will be explained next, stand for natural numbers, which satisfies the relationship, a<b<c<d<N. The groups A41 to E45 are classified based on the values of the map data numbers. The extraction of the map data representing the random maps is controlled using a random number control table 22 which will be explained next.

Figure 8A:
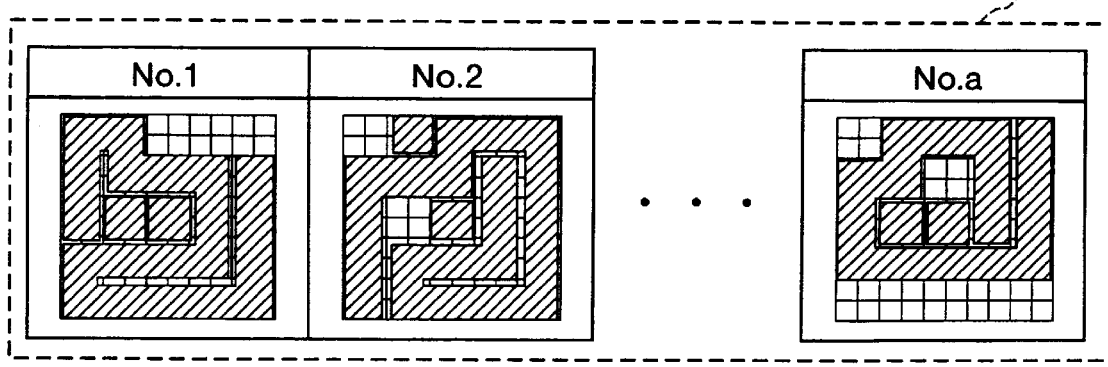
FIGS. 8A to 8E are diagrams demonstrating map data representing random maps according to the second embodiment.
Figure 8B:
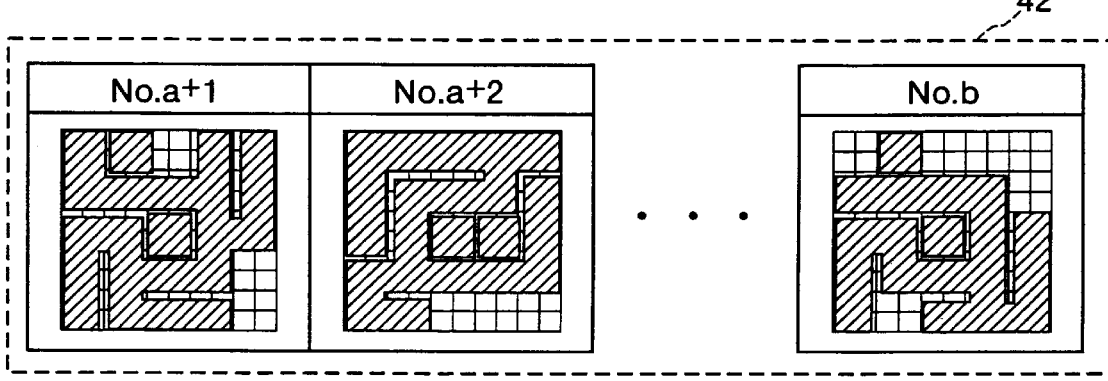
Figure 8C:
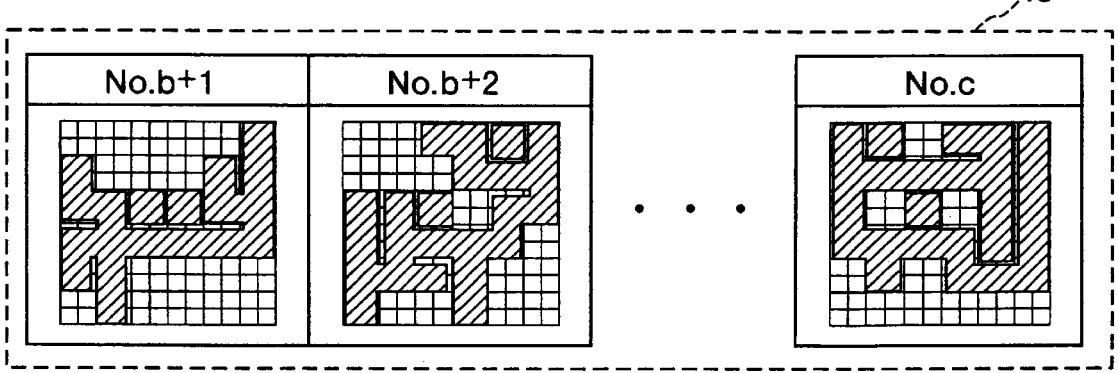
Figure 8D:
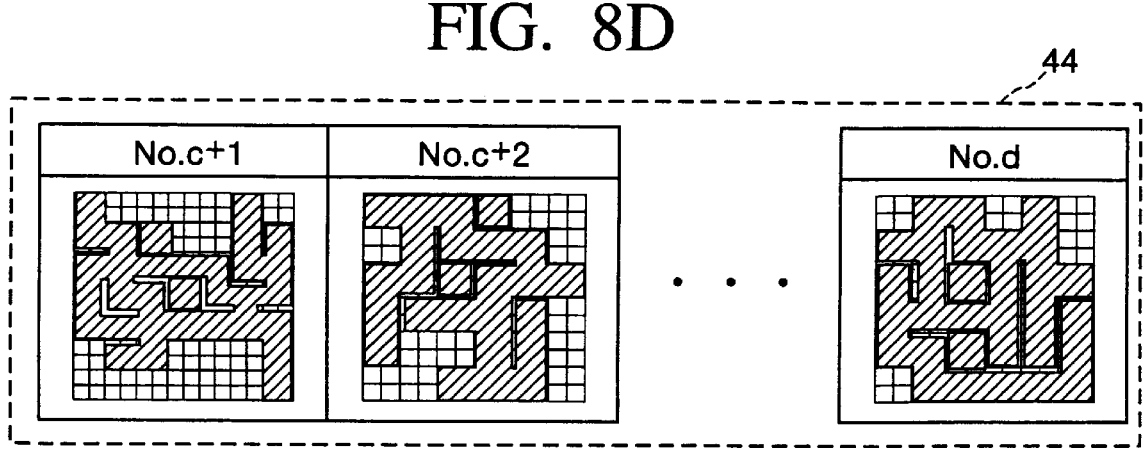
Figure 8E:
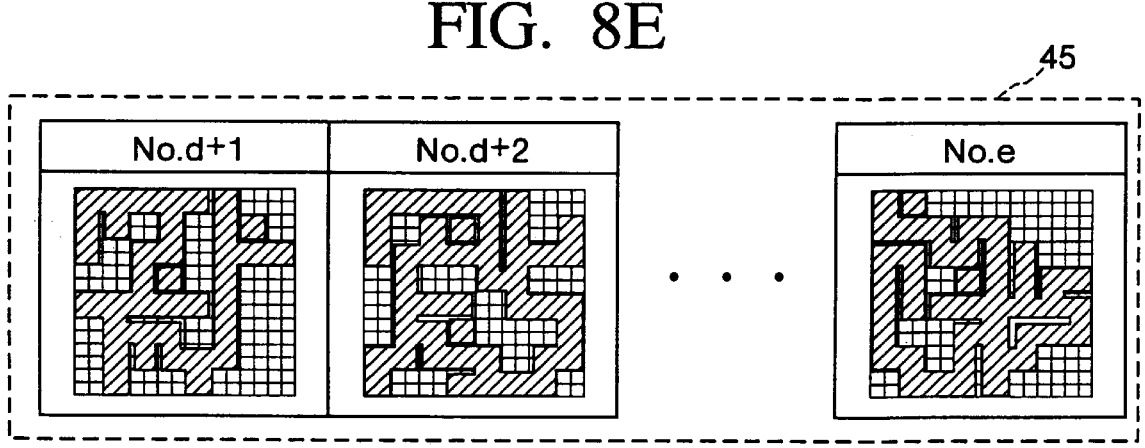

FIG. 9 is a diagram illustrating the random control table 22 stored in the relational data storage area 12b. In the case where the value of the progress degree data in the map control table 22 is 1, for example, a random number within a range of 1 to a being identical with the map data numbers included in the group A41 shown in FIG. 8A, are generated at the time of the execution of a random function.

Figure 10:
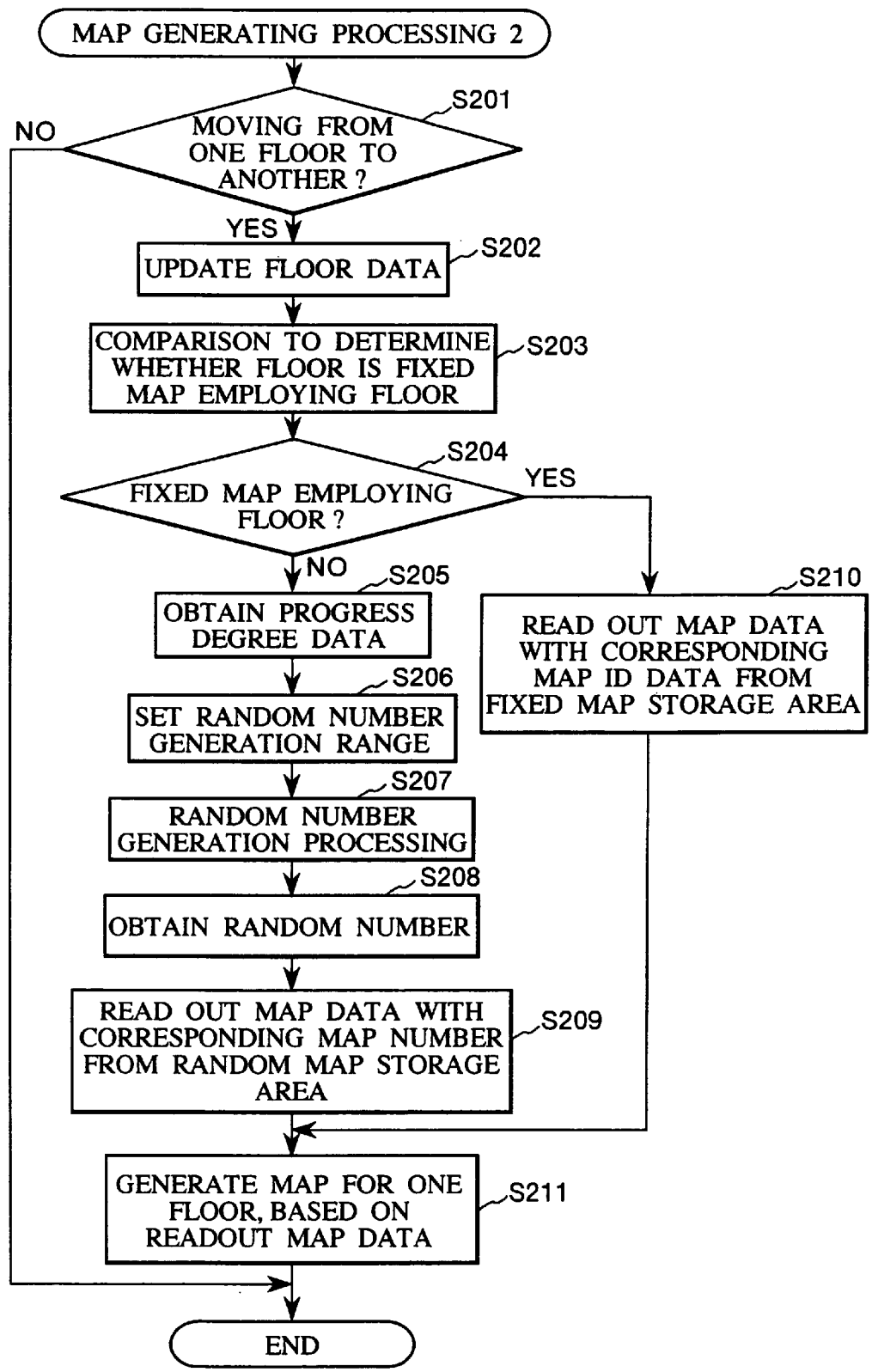
FIG. 10 is a flowchart showing processing performed in the second embodiment.

Processing for generating a map, which is executed by the control section 11 in the video game apparatus according to this embodiment, will now be described with reference to the flowchart of FIG. 10. As in the case of the first embodiment, the processing shown in the flowchart of FIG. 10 is also performed in parallel with the processing for moving the player character in accordance with an input from the input section 11. Further, let it be assumed that an event is advanced by performing processing different from that shown in the flowchart of FIG. 10, and the progress degree data is set according to whether or not a specific event could be cleared.

In the flowchart of FIG. 10, the procedures of steps S201 to S204 are identical to those of steps S101 to S104 shown in the flowchart of FIG. 6. To be specific, a determination as to whether the character is moving from one floor to another, the update of the floor data, and a determination as to whether the floor employs a fixed map, are performed.

The procedures of steps S210 and S211, which are executed in the case where it is determined in a step S204 that the value of the "current floor data" matches with any one of the values specified in the "fixed map employing floor" column, are also identical to the procedures of steps S108 and S109 shown in the flowchart of FIG. 6. Specifically, the reading of the map data representing the corresponding fixed map and the generation of a map based on the read map data are performed.

On the other hand, in the case where it is determined in step S204 that the value of the "current floor data" does not match with any one of the values specified in the "fixed map employing floor" column, the control section 11 obtains the value of the progress degree data stored in the map control table 21 (a step S205).

In the case where the control section 11 obtains the value of the progress degree data, it obtains the values stored as a random number generation range in the random number control table 22 in association with the value of the progress degree data (a step S206). Next, the control section 11 carries out the processing of generating a random number within the random number generation range (a step S207).

The procedures of subsequent steps S208, S209 and S211 to be executed thereafter are identical to those of steps S106, 107 and 109 shown in the flowchart of FIG. 6. That is, the processing of obtaining the value of the generated random number, the processing of reading out map data associated with the obtained value of the random number, among the map data representing the random maps classified into the groups A 41 to E45 and stored in the CD-ROM 4 as shown in FIGS. 8A to 8E, and the processing of generating the map based on the readout map data, are performed.

When the procedure of step S211 has been executed, the processing shown in the flowchart of FIG. 10 ends. Thereafter, the same process as that in the case of the first embodiment is conducted. That is, the image of the generated map is displayed.

Thus, according to the video game apparatus of the second embodiment, since the random number generation range, as well as the group from which map data representing a random map is to be selected, vary depending on the degree of the game progress, a characteristic random map according to the game progress, more specifically, a random map which becomes difficult as the game progresses, can be generated. Further, varying the random number generation range will be sufficient to generate a random map having a characteristic according to the degree of the game progress, and the processing is accordingly made easier.

Modifications Peculiar to Second Embodiment

The map data representing the random maps may be uniform in the positions of an entrance and an exit. Moreover, the map data representing the random maps may be classified into groups according to the positions of the entrance and the exit. Explaining this more specifically, the positions of exits on the maps generated based on the map data falling in a group A may be identical with the positions of entrances on the maps generated based on the map data falling in a group B, and the value obtained by dividing the value of the "current floor data" by 5 may be used as the value of the "progress degree data." This ensures a natural relationship between the floors.

In generating map data representing a random map, the group from which the map data is to be obtained can be set by a player's operation of the input section 3 at the start of the game. In this case, the progress degree data contained in the map control table 21 shown in FIG. 7 may be replaced with difficulty data which has been set by a player's operation of the input section 3. By so doing, it becomes possible to select a map to be generated, in accordance with the player's skill.

Modifications which are common to the first and second embodiments will now be described.

Map data for a floor employing a random map may be fixated after the setting of the random map for the floor is finished. In such a case, a map control table 23 shown in FIG. 11 may be used in place of the map control tables 20 and 21 mentioned previously. In the map control table 23 of FIG. 11, a "randomly extracted map number" column 23c has been set in association with each of the building floors defining the movable range of the player character. A map fixation fag 23d is set in association with each floor.

The map control table 23 explained as above is prepared, and if it has not been set with the map fixation flag 23d, any one of the random maps may be extracted through the execution of a random function each time the player character moves from one floor to another. Once the setting of the random maps of the floors is finished, the map fixation flag 23d may be set in association with the floors so that the maps as they are employed will now be fixed even though the player character moves between the floors over and over.

Figure 12:
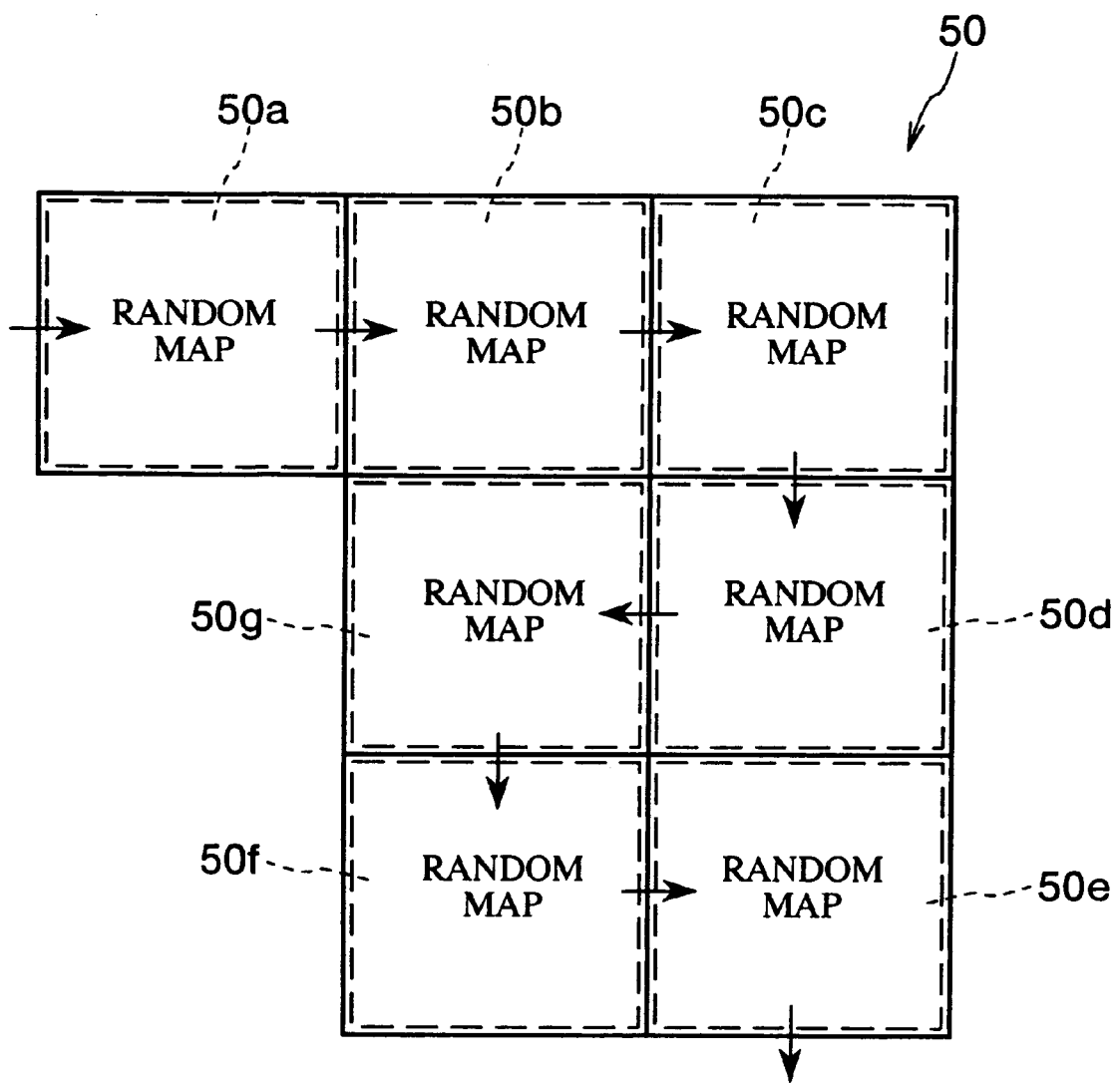
FIG. 12 is a diagram illustrating the image of a map having a planar structure.

The movable range of the character may be divided not only into sections such as the individual floors, but also into a plurality of sections 50a to 50g by partitioning a planar movable range 50 at predetermined coordinates, as illustrated in FIG. 12, for example. Of the planar movable range 50, the sections 50a to 50f may employ random maps, while the section 50g may employ a fixed map.

The random maps of the floors can be generated simultaneously. For example, in the case where the player character moves from the 10th floor to the 11th floor, all of the maps for the 10th to 19th floors, not just the map for the 11th floor only, can be generated. In this case, nine random numbers can be generated by either step S105 or S207, and the map data representing the random maps corresponding to the respective random numbers can be transferred from the CD-ROM 4 to the map data storage area 12c of the RAM 12.

The timing of the generation of the floor (section) forming a random map is not limited to the timing at which the player character moves from one floor to another. The maps of all sections (floors 1 to 62 in the first and second embodiments) may be generated at the start of the game, for example. Alternatively, the maps of some sections (floors 1 to 10 in the first and second embodiments) may be generated at the start of the game, and when the specific event set to the last fixed map section (floor 10 in the first and second embodiments) of those sections is completed, the maps of some subsequent sections (floors 11 to 20 in the first and second embodiments) may be generated.

The map data representing the random maps can not only be transferred to the RAM 12 as are after they are read out from the CD-ROM 4, but can also be subjected to processing such as rotation and reverse video before stored in the map data storage area 12c. This permits random map patterns which can be generated to be increased without having to increase the amount of map data stored in the CD-ROM 4.

The apparatus which serves as a platform for realizing the present invention is not limited to the video game apparatus 1 described above, and any one of various apparatuses, such a general-purpose computer like a personal computer, a portable game machine, an arcade game machine, etc., is applicable thereto.

A storage medium which stores and supplies a program and data for realizing the present invention, is not limited to the CD-ROM 4, and may be another type of medium such as a computer readable magnetic storage medium, an optical storage medium or a semiconductor memory. Further, the program and data for realizing the present invention may be supplied in the manner of pre-installing them into a hard disk for use in a general-purpose computer.

The mode of supply of the program and data for realizing the present invention is not limited to that of supplying the program and data with being stored in a storage medium such as the CD-ROM 4, and may be supplied in the form of a computer data signal embodied in a carrier wave from another device on the network 100. In this case, a request for transmission of the computer data signal may be sent from the communication interface 17 to another device on the network 100 through the communication cable 99, and the computer data signal as transmitted may be received and stored in the RAM 12. Thus, it is also possible to realize the present invention with the video game apparatus 1, through utilization of the program and data stored in the RAM 12.

The program (as shown in the flowcharts of FIGS. 6 and 10) and the map data (as shown in FIGS. 5A, 5B and FIGS. 8A to 8E) may be supplied from different mediums. For example, although the program is supplied from the CD-ROM 4 and transferred to the RAM 12 by the CD-ROM drive 16, the map data may be supplied from another device on the network 100 through the communication cable 99. Conversely, the map data may be supplied from the CD-ROM 4 and transferred to the RAM 12 by the CD-ROM drive 16, although the program is supplied from another device on the network 100 through the communication cable 99. Furthermore, the program and the map data can be supplied even if they are stored on separate CD-ROMs.

The present invention can be embodied in any other specific form, without departing from the spirit and scope thereof. The above-described embodiments are referred to only for explanation and do not limit the present invention. The scope of the present invention is shown by the attached claims rather than the embodiments. All modifications made within the meaning of an equivalent of the claims and the range of the claims are to be regarded to be within the scope of the present invention.

What is claimed is:

1. A video game apparatus for generating a map defining a range of movement of a character that moves in accordance with external instructions, comprising:

first storage means for storing a set of map data for a first type section which is one of plural sections provided by dividing a field where the character moves through, and which is set with a specific event, and for storing plural sets of map data for second type sections other than the first type section;

section designating means for designating at least one section as a map generation target among the plurality of sections, in accordance with the movement of the character;

section discriminating means for discriminating whether the section designated by said section designating means is of the first type or the second type;

data load means for loading the map data set for the first type section from said first storage means when said section discriminating means discriminates that the designated section is of the first type, and for loading one of plural sets of map data for the second type section when said section discriminating means discriminates that the designated section is of the second type; and second storage means for storing the map data loaded by said data load means; and map generating means for generating a map based on the map data stored in said second storage means.

2. The video game apparatus according to claim 1, wherein:

in the case where the character moves from one section to another, said section designating means designates a moving destination section as a section for which a map is to be generated.

3. The video game apparatus according to claim 1, wherein:

in the case where said section discriminating means discriminates that said section is of the second type, said data load means load one of the plural map data sets for the sections of the second type, even in a case where a map has already been generated for said section.

4. The video game apparatus according to claim 1, wherein:

in the case where said section discriminating means discriminates that said section is of the second type, said data load means loads a map data set extracted randomly from the plural map sets data for the sections of the second type.

5. The video game apparatus according to claim 1, wherein:

the plural map data sets for the sections of the second type, stored in said first storage means, have been classified into groups in accordance with a predetermined standard; and in the case where said section discriminating means discriminates that said section is of the second type, said data load means load a map data included in a pre-designated group.

6. The video game apparatus according to claim 5, further comprising:

group designating means for designating, in accordance with a degree of game progress, a group from which the map data set is to be selected in the case where said data load means load the map data set for the section of the second type.

7. The video game apparatus according to claim 5, further comprising:

group designating means for designating, in accordance with a setting based on an external instruction, a group from which the map data set is to be selected in the case where said data load means load the map data set for the section of the second type.

8. The video game apparatus according to claim 1, further comprising:

map registering means for registering the map which said map generating means has generated for the section of the second type, in association with the section for which the map has been generated.

9. The video game apparatus according to claim 1, wherein:

said field where the character moves through is shaped into floors, and each of the floors corresponds to one of the sections of the first and second types.

10. A method for generating a map defining a range of movement of a character that moves in accordance with an external instruction, said method comprising:

a section designating step of designating at least one section as a map generation target among a plurality of sections provided by dividing a field where the character moves through, in accordance with the movement of the character;

a section discriminating step of discriminating whether the section designated at said section designating step is a section of a first type section which is set with a specific event or a section of a second type other than the section of the first type;

a data loading step of loading a pre-stored map data set being associated with the first type section to a predetermined area in a memory when said section discriminating step discriminates that the designated section is of the first type, and for loading pre-stored one of plural map data sets being associated with the second type section to said predetermined area in said memory when said section discriminating step discriminates that the designated section is of the second type; and a map generating step of generating a map based on the map data stored in said predetermined area in said memory.

11. The method for generating the map according to claim 10, wherein:

in the case where the character moves from one section to another, said section designating step designates a moving destination section as a section for which a map is to be generated.

12. The method for generating the map according to claim 10, wherein:

in the case where said section discriminating step discriminates that said section is of the second type, said data loading step reloads any one of the plural map data sets for the sections of the second type, even in a case where a map has already been generated for said section.

13. The method for generating the map according to claim 10, wherein:

in the case where said section discriminating step discriminates that said section is of the second type, said data loading step loads a map data set extracted randomly from the plural map data sets for the sections of the second type.

14. The method for generating the map according to claim 10, wherein:

the plural map data sets for the sections of the second type are pre-stored, being classified into groups in accordance with a predetermined standard; and in the case where said section discriminating step discriminates that said section is of the second type, said data loading step loads a map data set included in a pre-designated group.

15. The method for generating the map according to claim 14, further comprising:

a group designating step of designating, in accordance with a degree of game progress, a group from which the map data set is to be selected in the case where said data loading step loads a map data set for the section of the second type.

16. A computer readable storage medium containing a program stored therein for generating a map defining a range of movement of a character that moves in accordance with an external instruction, said program comprising:

a section designating step of designating at least one section as a map generation target among a plurality of sections provided by dividing a field where the character moves through, in accordance with the movement of the character;

a section discriminating step of discriminating whether the section designated by said section designating step is a section of a first type which is set with a specific event or a section of a second type other than the section of the first type;

a data loading step of loading a pre-stored map data set being associated with the first type section to a predetermined area in a memory when said section discriminating step discriminates that the designated section is of the first type, and for loading pre-stored one of plural map data sets being associated with the second type section to said predetermined area in said memory when said section discriminating step discriminates that the designated section is of the second type; and a map generating step of generating a map based on the map data stored in said predetermined area in said memory.

17. The computer readable storage medium according to claim 16, wherein:

in the case where the character moves from one section to another, said section designating step designates a moving destination section as a section for which a map is to be generated.

18. The computer readable storage medium according to claim 16, wherein:

in the case where said section discriminating step discriminates that said section is of the second type, said data loading step loads any one of the plural map data sets for the sections of the second type, even in a case where a map has already been generated for said section.

19. The computer readable storage medium according to claim 16, wherein:

in the case where said section discriminating step discriminates that said section is of the second type, said data loading step loads a map data set extracted randomly from the plural map data for the sections of the second type.

20. The computer readable storage medium according to claim 16, wherein:

the plural map data sets for the sections of the second type are pre-stored in said storage means, with the plural data being classified into groups in accordance with a predetermined standard; and in the case where said section discriminating step discriminates that said section is of the second type, said data loading step loads a map data set included in a pre-designated group.

21. The computer readable storage medium according to claim 20, wherein:

the program further comprises a group designating step of designating, in accordance with a degree of game progress, a group from which the map data set is to be selected in the case where said said data loading step loads a map data set for the section of the second type.

22. A computer data signal embodied in a carrier wave and including a program for causing a computer to generate a map defining a range of movement of a character that moves in accordance with an external instruction, said program comprising:

a section designating step of designating at least one section as a map generation target among a plurality of sections provided by dividing a field where the character moves through, in accordance with the movement of the character;

a section discriminating step of discriminating whether the section designated by said section designating step is a section of a first type which is set with a specific event or a section of a second type other than the section of the first type;

a data loading step of loading a pre-stored map data set being associated with the first type section to a predetermined area in a memory when said section discriminating step discriminates that the designated section is of the first type, and for loading pre-stored one of plurality map data sets being associated with the second type section to said predetermined area in said memory when said section discriminating step discriminates that the designated section is of the second type; and a map generating step of generating a map based on the map data stored in said predetermined area in said memory.

23. The video game apparatus according to claim 1, wherein each of the plurality of the map data for the second type sections includes all data necessary for regulating the range of the character movement on a map to be generated based on the corresponding map data.

24. The video game apparatus according to claim 6, wherein said group designating means comprise random number generating means for generating random numbers within the range which is preset in accordance with the degree of game progress.

25. A video game apparatus having a processor, and input devices, a first memory, a second memory, and a display connected to said processor, for generating map which regulates a range of character's movement, wherein:

said input devices input data for moving the character;

said first memory stores a set of map data associated with a first type section which is set with a specific event, of a plurality of sections prepared by dividing a field where the character moves through, and stores plural set of map data for second type sections other than the first type section;

said second memory comprises:

a map data area to which one of the map data sets for the first and second type sections is transferred from said first memory; and a program area for storing a program comprising the steps of:

designating at least one target section to form a map from a plurality of sections prepared by dividing a field where the character moves through in accordance with the character's movement;

discriminating whether the section designated by said designating step is the first type section to which the predetermined event is assigned or the second type section other than the first type section;

transferring the map data set for the first type section form said first memory to said map data area when said discriminating step discriminates that the designated section is the first type section, and selecting any of the plural sets of map data for the second section and transfers the selected data from said first memory to said map data area when said discrimination step discriminates that the designated section is the second type section; and generating a map based on the map data transferred by said transferring step, said processor sequentially executes the steps of the program stored in said program area, and generates image data for displaying the map generated by said map generating step on said display together with the character; and said display displays images corresponding to the image data generated by said processor.

26. The video game apparatus according to 25, wherein said first memory is a removable memory of said video game apparatus.

* * * * *